United States Patent [19]

Peart et al.

[11] 4,154,110
[45] May 15, 1979

[54] HOUSING ASSEMBLY FOR BAROMETER OR OTHER INSTRUMENT HAVING A SETTABLE INDEX

[75] Inventors: Edward L. Peart, Arden; Charlie J. Howard, Asheville, both of N.C.

[73] Assignee: Sybron Corporation, Rochester, N.Y.

[21] Appl. No.: 869,280

[22] Filed: Jan. 13, 1978

[51] Int. Cl.² ............................................ G01D 11/26
[52] U.S. Cl. .................................. 73/431; 58/91; 73/386
[58] Field of Search ................ 73/431, 384, 386, 387; 220/307; 58/91, 53, 54, 88 R

[56] References Cited

U.S. PATENT DOCUMENTS

| 2,709,333 | 5/1955 | Fengler | 58/91 |
|---|---|---|---|
| 2,716,327 | 8/1955 | Franklin et al. | 73/384 X |
| 2,719,403 | 10/1955 | Gisiger | 73/431 X |
| 2,866,940 | 12/1958 | Lamb | 73/431 X |
| 3,561,089 | 7/1968 | Fisher | 58/88 R |
| 3,651,693 | 3/1972 | Alinari | 73/300 |
| 4,027,776 | 6/1977 | Douglas | 220/307 |

FOREIGN PATENT DOCUMENTS

436137  11/1967  Switzerland .................................. 58/91

*Primary Examiner*—Daniel M. Yasich
*Attorney, Agent, or Firm*—Theodore B. Roessel; Joseph C. MacKenzie

[57] ABSTRACT

A barometer having an index on the crystal. The crystal is freely rotatable for setting the index. The barometer case has spring fingers preventing the crystal from being removed therefrom unless the fingers are disengaged by means of a suitable tool.

3 Claims, 4 Drawing Figures

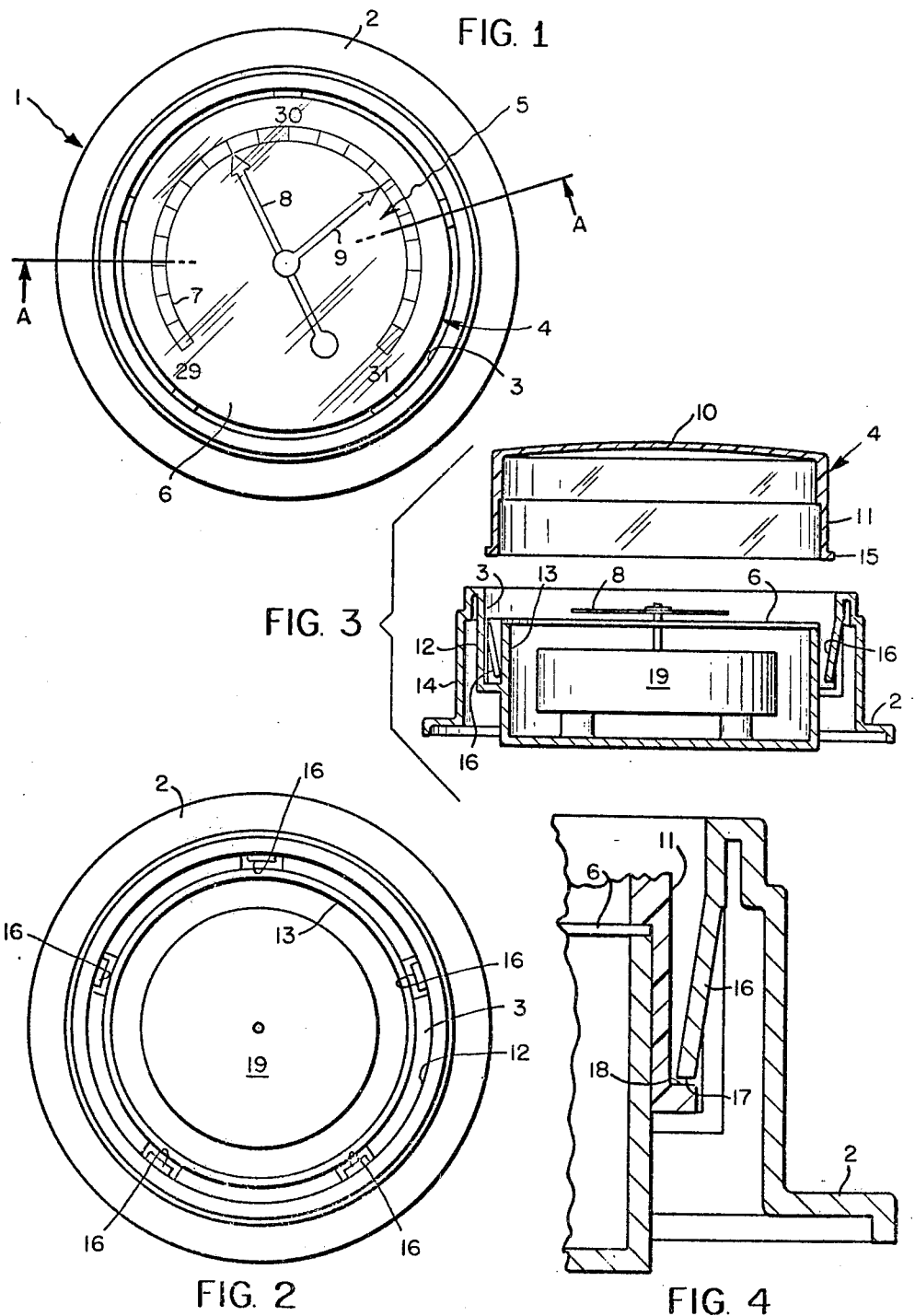

HOUSING ASSEMBLY FOR BAROMETER OR OTHER INSTRUMENT HAVING A SETTABLE INDEX

BACKGROUND OF THE INVENTION

Barometers commonly have indexes settable independently of the barometer for showing direction of barometric pressure change. In the prior art such indexes have been incorporated in or mounted on the crystal of the barometer case for setting either by rotating the crystal or the pointer.

It is the general object of the present invention to provide an improved form of barometer wherein the barometer pressure change direction indicator is set by rotating the barometer crystal. A particular object of the invention is to provide a new and improved manner of mounting the crystal for rotation whereby the crystal is freely-rotatable yet effectively not removable, except by means of a special tool.

SUMMARY OF THE INVENTION

The barometer assembly is contained in a case for viewing through a crystal rotatably held in place by several spring-biased locking means which simultaneously allow the crystal to rotate and prevent it from being disassembled from the case. In particular, the crystal has a peripheral flange, the flange has a radial lip, and the locking means are spring fingers projecting from the case and over the lip. A flange-like tool, inserted between the crystal's flange and the fingers, deflects the fingers away from the lip, thereby allowing the flange to be removed from the barometer case.

BRIEF DESCRIPTION OF THE DRAWING

FIG. 1 is a plan view of a barometer according to the present invention.

FIG. 2 is a plan view of the barometer case shown in FIG. 1.

FIG. 3 is an exploded view on section AA, FIG. 1.

FIG. 4 is an enlarged showing of a portion of FIG. 3.

DESCRIPTION OF THE PREFERRED EMBODIMENT

In FIG. 1, the reference numeral 1 generally denotes the case of a barometer in accordance with the present invention. Case 1 has a radial flange 2 extending therearound, and an annular channel 3 receiving the peripheral flange 4 of a crystal generally indicated by the reference numeral 5.

Crystal 5 is transparent so within the interior of the case 1 can be seen the normally-visible parts of the instrument movement, namely, scale plate 6 having barometer scale 7 thereon over which sweeps a pointer 8, under the impetus of the expansions and contractions of an aneroid capsule (not visible in FIG. 1, but it would be located behind the plate 6).

Crystal 5 also has a barometric pressure change direction index 9 thereon, in the form of an arrow glued, printed, hot-stamped or otherwise incorporated in the crystal 5, which may be made of clear styrene.

From FIG. 3, it will be evident that the crystal 5 consists essentially of the approximately flat circular portion 10 from which extends the flange 4, essentially in the form of a right circularly cylindrical wall portion 11 depending from the periphery of the portion 10.

FIG. 3 likewise shows that the channel 3 is formed between case 1's right circularly cylindrical wall portions 12 and 13, which between them receive the flange 4. The wall portions 11, 12 and 13 are concentric with the axes of rotation of pointer 8 and index 9, and with the main wall 14 of the case 1.

At the lower end of flange 4 is an annular, radially-extending lip 15. The effective thickness of the flange 4, including lip 15 is somewhat less than the width of the channel 3. This is to provide not only for mounting the crystal 5 in place with the flange 4 in the channel 3, but also to provide for locating spring fingers 16 at an acute angle to both the wall portion 11 and the wall portion 12 whereby the flange 4 can be thrust into the channel 3 so as to deflect the fingers 16 toward wall portion 14. The fingers 16 are integral parts of wall portion 14 and their ends fall enough short of the bottom of channel 3 that when the lip 15 rests on the bottom of the channel (both this and the bottom of the lip are effectively coplanar) the fingers can deflect back over the lip 15, so that if one now attempts to remove the crystal 5, the fingers 16 catch on lip 15. As will be seen from FIG. 4's showing of the conformation of the upper side 17 of lip 15 and of under sides 18 of the finger ends, unless the finger ends are sprung out of the way, the crystal cannot be removed short of damaging the lip and/or fingers.

Nevertheless, the crystal remains both freely rotatable, and settable, in effect, so that the index 9 thereon can be set to remember (sic) a particular reading of pointer 8 for later comparison with a new reading of pointer 8.

As FIG. 2 shows, the fingers are five in number and equi-spaced around flange 4. Conveniently, a right circularly cylindrical annulus of cardboard or the like (not shown), of inner diameter great enough to pass flange 4, and thick enough to deflect the fingers clear of lip 15, can be inserted in the channel 3 between wall portions 11 and 12, whereby to permit withdrawing the flange 4 from channel 3, say in order to gain access to the aneroid or other mechanism 19 forming part of the instrument assembly in case 1.

The case 1, fingers and all, is preferably made in one piece from a typical ABS thermoplastic (e.g., Cycolac), which provides adequate springiness to the fingers, and as well has the strength, hardness, and other properties making it suitable for use as a barometer case.

Having described my invention in accordance with the statutes, I claim:

1. A instrument assembly comprising a movement, a case, and a crystal;
   a. said movement being contained in the interior of said case and having indicating means exteriorly visible through said crystal;
   b. said crystal having thereon index means overlying said indicating means, and said crystal also having a flange extending therefrom into the interior of said case and surrounding said movement;
   c. said case having an annular channel defined by two walls for rotatably receiving said flange, said case also having locking means positioned along one of the walls of said channel, said locking means extending spring-biased from said one wall of said channel and positioned with respect to said flange for yieldably allowing said flange to be inserted in said channel and thereafter preventing said crystal from being removed from said case.

2. The instrument assembly of claim 1, wherein said flange is right-circularly cylindrical and has a circumferential radial lip, and wherein said locking means are spring fingers projecting from said case and over said lip.

3. A instrument assembly comprising of a movement, a case, and a crystal;
   a. said movement being contained in the interior of said case and having indicating means exteriorly visible through said crystal;
   b. said crystal having a flange extending therefrom into the interior of said case and surrounding said movement;
   c. said case having plural locking means spaced along said flange, said locking means being spring-biased positioned with respect to said flange for preventing said crystal from being removed from said case;
   d. said case having walls defining a channel receiving said flange but spaced therefrom, and said locking means being spring fingers extending from one of said walls and toward said flange at an acute angle, said flange having a lip extending under the said spring fingers, and said one of said walls and said flange being everywhere spaced from one another by more than the radial extent of said lip, and said spring fingers being deflectable far enough to clear said lip.

* * * * *